US007774091B2

(12) United States Patent
Jackman

(10) Patent No.: US 7,774,091 B2
(45) Date of Patent: *Aug. 10, 2010

(54) SYSTEM FOR DESIGNING, PREVIEWING AND CUTTING NATURAL STONE VENEER TO DELIVER READY FOR INSTALLATION

(75) Inventor: Kenneth A. Jackman, Uxbridge, MA (US)

(73) Assignee: New World Stoneworks, LLC, Uxbridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/348,093

(22) Filed: Jan. 2, 2009

(65) Prior Publication Data

US 2009/0107070 A1 Apr. 30, 2009

Related U.S. Application Data

(63) Continuation-in-part of application No. 11/360,051, filed on Feb. 22, 2006, now Pat. No. 7,489,984.

(51) Int. Cl.

| | |
|---|---|
| ***G01N 3/56*** | (2006.01) |
| ***B24C 1/04*** | (2006.01) |
| ***B24C 1/00*** | (2006.01) |
| *B24C 3/32* | (2006.01) |

(52) U.S. Cl. ......................... 700/183; 700/159; 451/36; 451/41; 125/1

(58) Field of Classification Search ................... 451/26; 700/183, 159; 125/1
See application file for complete search history.

(56) References Cited

U.S. PATENT DOCUMENTS

| | | | | |
|---|---|---|---|---|
| 4,272,017 | A * | 6/1981 | Franz | 239/1 |
| 4,937,985 | A * | 7/1990 | Boers et al. | 451/75 |
| 5,568,391 | A * | 10/1996 | Mckee | 700/122 |
| 5,586,925 | A * | 12/1996 | DiNorcia et al. | 451/35 |
| 5,637,030 | A * | 6/1997 | Chopra et al. | 451/39 |
| 6,533,640 | B1 * | 3/2003 | Nopwaskey et al. | 451/2 |
| 6,616,372 | B2 * | 9/2003 | Seroka et al. | 404/72 |
| 2006/0040590 | A1 * | 2/2006 | Sciulli et al. | 451/38 |
| 2006/0135041 | A1 * | 6/2006 | Boone et al. | 451/5 |
| 2007/0126155 | A1 * | 6/2007 | Korwin-Edson et al. | 264/333 |

OTHER PUBLICATIONS

"Numerically Controlled Water Cutter", -Li et al, Key Engineering Materials vol. 250 (2003) pp. 274-280.*

"The Cuttability of Rock using high pressure water jet", PC Hagan, University of South Wales, Sydney, 1992.*

"Hydro-Abrasive cutting head—energy transfer efficiency", Galecki et al, University of Missouri-Rolla, Date Unkown.*

"Flow: Waterjet Curring Applications", printed from the wayback machine covering flowcorp.com with save date Dec. 29, 2004.*

"Flow: UHP Waterjet Cutting Systems", Flow international Corporation, 2002.*

* cited by examiner

*Primary Examiner*—Michael D Masinick
(74) *Attorney, Agent, or Firm*—Arendt & Associates IP Group; Jacqueline Arendt

(57) ABSTRACT

The present invention relates to a method of designing, previewing a natural stone veneer project in its entirety before a single stone is cut; cutting and finishing the edges of a natural veneer stone to form interconnecting finished natural stone veneer components having a weathered appearance, each component having a perimeter of a pre-determined contour and a finished edge.

16 Claims, 9 Drawing Sheets

SYSTEM FOR DESIGNING, PREVIEWING AND CUTTING NATURAL STONE VENEER TO DELIVER READY FOR INSTALLATION

CROSS REFERENCE TO RELATED APPLICATIONS

This application is a Continuation in Part of U.S. patent application Ser. No. 11/360,051 filed on Feb. 22, 2006 now U.S. Pat. No. 7,489,984, the entire teachings of which are incorporated herein by reference.

BACKGROUND OF THE INVENTION

There is currently no easy-to-use technique available for designing, cutting and installing uniformly-fitting natural stone veneer components. Natural stone veneer, as the terra is used by those of skill in the art of cutting natural stone, is natural stone having an irregular or varied surface such that the natural stone veneer varies in thickness. Only manual, multi-step, labor-intensive methods are available for cutting and finishing the edges on natural stone veneer components. None of the current techniques offer the chance to preview the overall patterns of natural stone veneer components in advance of installation or amend a design before it is installed.

Starting with pallets of raw stone and cutting individual stones on a jobsite is an extremely time consuming undertaking that can prove challenging when managing a large project with tight deadlines. Further, typical techniques for dry-cutting natural stone at a jobsite generate potential health hazards from airborne stone dust, produce a messy work environment and cause damage to surrounding landscaping due to extended worker activity in the area. These environmental problems are of great concern particularly when the work is being done at an occupied residence or commercial location. Yet another time-consuming construction problem is achieving a style of stonework having the appearance of early New England fieldstone stonework. To achieve the appearance of this historical stonework, prior art methods require use of stones that have been naturally weathered and rounded over a period of many centuries by the action of water, weather and glacial movements. In building this style of stonework, the mason begins by selecting, from among many rounded stones, individual stones each having a size and fit such that each can be placed in the construction project in a way that results in the appearance of the stones as fitting tightly together. This is a very laborious process.

Because of the above-described difficulties, pre-cast artificial stone veneers are increasingly used in vertical applications such as residential exteriors, outdoor fireplaces and chimneys. Use of artificial stone veneer generally does not provide a means to preview the exact layout pattern of individual pieces prior to installation. Further, cutting artificial stones to fit around openings such as doors or windows, exposes unattractive cement aggregates.

Thus the need exists for improved methods of cutting natural stone and finishing the edges such that they appear to have been prepared using traditional chisel and hammer techniques when installed. There is also a need for producing natural stone components that require less skill to install than commercially available components that are either in rough form or approximately squared up, requiring additional cutting for installation.

Prior methods of cutting natural stone for veneer applications include using a hammer and chisel, hydraulic snapping equipment, large circular diamond blades to cut the stone or a combination of these techniques. Currently, some types of smooth, uniform-surfaced natural stone such as polished granite and marble countertop slabs or stone tiles used for floor inlays are cut with an abrasive waterier, from an abrasive waterjet machine. Abrasive waterjet cutting is a process that uses a mixture of high-pressure water and abrasive to cut material that is as soft, as styrofoam or as hard as titanium. However, prior to our discovery, there has been no method for practical or reliable use of a waterjet for cutting the rough, irregular surface common to veneer stone. To our knowledge, prior to our invention a waterjet has not been used to cut veneer stone.

It is generally known among those of skill in the art of stone-cutting, that the greater the distance from the stone surface that the cutting head of a waterjet is raised, the less precise is the resulting cut. The cut is rougher, i.e., less smooth. The higher the cutting head is raised off the stone surface, the lesser the force of the waterjet, producing wider cut and changing the geometry of the cut.

Prior to the disclosed methods, no one has drawn complete design plans for the actual cutting patterns of interconnecting veneer stone components for a project. The design of such projects has been determined in the field.

The terms “waterjet”, “waterjet machine”, and “waterjet cutting”, as used herein, will have the same meaning as “abrasive waterjet”, “abrasive waterjet machine”, and “abrasive waterjet cutting”, respectively.

The current way in which waterjets are actually used for cutting applications, and the methods of use of waterjets prescribed by manufacturers of such waterjet equipment in the directions and documentation provided with waterjet machines is to keep the waterjet as close as possible to the surface of the material being cut. Waterjets are intended to produce highly precise cuts on uniformly fiat material by keeping the head of the waterjet machine as tight as possible to the material being cut. The instructions of the manufacturer generally warn that if the waterjet is not kept close to the surface of the material, the pressure of the waterjet and the concentration of abrasive may be diminished such that the cut will not be clean or precise. Conventional practice in the waterjet industry places such a priority on maintaining a consistent, minimal standoff from the material being cut, that some companies have even developed systems for sensing gradual sloping curvatures over smooth material and adjusting the cutting head to maintain a minimal predetermined standoff. Other companies have developed programmable z-axis controls to be able to program the raising and lowering of the cutting head in relation to precise geometries of the material being cut, so as to maintain minimal standoff. The common factor is the attempt to run with the smallest possible standoff from the material so as to ensure the most precise cut, and the reduction of taper due to the dissipation of energy of the waterjet at increasing depth of cut. None of these systems are able to reliably navigate the extremely rough and irregular surfaces characteristic of the type of veneer stone described herein.

SUMMARY OF THE INVENTION

The invention inter alia includes the following, alone or in combination. One embodiment of the invention relates to a method of cutting a natural stone to form a natural stone veneer component having a perimeter of a predetermined contour and an edge at the perimeter, the method comprising:

a) positioning a cutting head of an abrasive waterjet machine over the stone at a distance of from about 0.3 inch to about 4 inches, or from about 0.762 centimeter to about 10.16 centimeters, from a contact surface of the stone; and b) cutting through the stone by contacting the contact surface of the stone with an abrasive waterjet from the waterjet machine, the waterjet at a pressure of from about 18,000 pounds per square inch to about 80,000 pounds per square inch, or from about $1.24\times10^{8}$ kg/m·sec$^{2}$ to about $5.52\times10^{8}$ kg/m·sec$^{2}$, thereby forming the natural stone veneer component having a perimeter of a pre-determined contour and an edge at the perimeter.

Another embodiment of the invention is a method of preparing from a natural stone a natural stone veneer component for installation thereof in a project, the method comprising:

a) programming, scanning or otherwise inputting a cutting pattern for forming the natural stone veneer component;

b) converting the pattern into a machine-readable program to produce a cutting path on an abrasive waterjet machine;

c) loading a cutting path file for the stone veneer component into the abrasive waterjet machine;

d) positioning a cutting head of the waterjet machine over the natural stone at a distance of from about 0.3 inch to about 4 inches from a contact surface of the stone;

e) running the cutting path program and cutting through the stone by contacting the contact surface of the stone with a waterjet from the waterjet machine, the waterjet at a pressure of from about 18,000 pounds per square inch to about 80,000 pounds per square inch, to result in formation of the natural stone veneer component having a perimeter of a pre-determined contour; and f) optionally, repeating steps d and e a number of times sufficient to produce a number of natural stone veneer components according to the cutting pattern needed for the project.

Yet another embodiment of the invention is a method of preparing from a natural stone a plurality of inter-connecting natural stone veneer components for installation thereof in a project, the method comprising:

a) drawing or otherwise importing a design plan comprising overall dimensions and shape of a finished stone veneer project;

b) drawing or otherwise importing a pattern of shape and placement of the stone veneer components within the design plan;

c) programming, scanning or otherwise inputting a plurality of cutting patterns, wherein the cutting patterns are the same or different, each cutting pattern designed to form the stone veneer component having a perimeter of a predetermined contour;

d) converting the pattern into a machine-readable program to produce a cutting path on an abrasive waterjet machine;

e) loading a cutting path file for the stone veneer component into the abrasive water jet machine;

f) positioning a cutting head of the waterjet machine over the natural stone at a distance of from about 0.3 inch to about 4 inches from a contact surface of the stone;

g) running the cutting path program and cutting through the stone by contacting the contact surface of the stone with a waterjet from the waterjet machine, the waterjet at a pressure of from about 18,000 pounds per square inch to about 80,000 pounds per square inch, to result in formation of the natural stone veneer component having a perimeter of a pre-determined contour; and h) optionally, repeating any of steps d, e, f, and g a number of times sufficient to produce a number of the inter-connecting natural stone veneer components according to the design plan needed for the project.

A natural stone veneer component produced according to the disclosed method may have a perimeter of a pre-determined contour and an edge at the perimeter that is finished to appear to have been worked using traditional chisel and hammer techniques. For example, a technique commonly referred to as "pitching the edge" may be used to finish the perimeter edge around the face of the stone veneer component that is intended to be visible after the component is installed. In this technique, a chisel and hammer, hammer or other equipment is used to fracture off the corner edge, exposing the naturally irregular interior character of the stone. In some stones, the interior may have facets or a crystalline appearance. Pitching the edge may produce an aesthetically pleasing edge that will give the appearance that the entire stone had been shaped using traditional chisel and hammer techniques.

The present invention relates, in another aspect, to a method of preparing from natural stone a plurality of natural stone components for installation thereof in a project, the system comprising:

a) programming a cutting pattern for the natural stone veneer component to be used in the project, b) converting the pattern into a machine-readable program to produce a cutting path for an abrasive waterjet;

c) loading the cutting path file into an abrasive water jet machine;

d) positioning a cutting head of the waterjet machine over the natural stone at a distance of from about 0.25 inch to about 4 inches from a contact surface of the stone;

e) running the cutting path program, cutting through the stone by contacting the contact surface of the stone with the abrasive waterjet from the waterjet machine, the waterjet at a pressure of from about 18,000 pounds per square inch to about 80,000 pounds per square inch, to result in formation of the natural stone veneer component having a perimeter of a pre-determined contour.

f) optionally, repeating steps d and e a number of times sufficient to produce the number of the same shape natural stone veneer components needed for the project. Optionally, in order to form additional unique veneer components in the project design, steps a through f can be repeated for each additional unique cutting pattern The present invention has many advantages. Tire methods according to various embodiments of the invention provide a process for cutting natural stone according to a predetermined veneer design and finishing the edge of the resulting stone veneer components. A significant amount of effort and time is saved in bringing the stone from raw material to a condition wherein if is ready for installation, fit with other natural veneer stones prepared in this process.

Prior to invention of the disclosed subject matter, there was no way to preview the pattern of interconnecting veneer stones before a job was begun. Traditional veneer stone techniques frequently necessitate cutting individual stones to fit with the shapes of stones previously installed. The patterns evolved on the job site, and were driven by the shape of raw stock to minimize cutting. Not only does this method prove costly when attempting to achieve consistently tight joints between stones due to intensive cutting, but it frequently results in unappealing lines and patterns running through a job patterns that become visible only when the final installation is viewed. At that point, short of breaking apart sections of the project, there would be no way to remedy the situation.

Particularly on larger stone projects, traditional techniques for fitting veneer stone are plagued by the fact that each mason tends to have a unique style in cutting stones. When a project involves multiple masons, working at different times, stone work across the job may exhibit different characteristics in the shapes and sizes of individual stones, as well as in the way stone are fit together. The method disclosed herein provides control in the uniformity of design across a project and consistency in the character, size and fit of stone veneer components throughout the project. This consistency in overall character of the project will remain true to the previewed design, even when multiple masons are working together to install the pre-cut veneer stone components.

The disclosed method provides a unique solution for designing and previewing a stone masonry project in its entirety before a single stone is cut. This affords a homeowner, contractor, architect or mason the ability to see all cut lines in projects where randomly shaped, intersecting stones are fit together.

The disclosed method makes it possible to fit the raw stone material to the desired outcome of the project in terms of shapes and overall installation.

Because the whole project can be viewed in its entirety before a single stone is cut, greater creativity is provided for the design.

Because the disclosed method of cutting the stone to a pre-planned design yields highly precise fits, a relative novice can master the basic skills of dry stacking or setting stones in mortar and achieve extremely high quality results.

The disclosed system combines a printed or electronically downloadable map of numbered stones with the pallets of corresponding numbered stones. By following the map as a guide, the installer is able to place each stone in its appropriate location relative to surrounding stones. If the stones were to become mixed up, using the map, each numbered stone can be identified in the project and installed in its appropriate location.

All materials would be delivered to the jobsite ready for installation. This reduces the bulk of the labor time on a typical stone masonry job, by eliminating the laborious task of cutting each individual stone to fit.

By delivering fully cut stones, everything delivered is 100% utilized. This also decreases the cost of delivering material to the jobsite and eliminates the expense of removing and disposing of waste stone fragments.

At the jobsite, the disclosed methods enable the mason to install each stone, without having to repeatedly test the fit with surrounding stones and make alternations until the stone fits in place. The stones would be cut to fit perfectly with the surrounding stones. The benefit here is labor and cost reduction by eliminating a repetitious task.

Our invention also enables the delivery of a complete masonry stone project kit. The advantage is that an installer, whether a mason or an untrained homeowner has a complete assembly map, view of the finished project, and all stone materials cut to size. This consistency and predictability decreases the uncertainty that exists in the current industry, wherein raw stone arrives on pallets, with little indication of what finished project will result.

The overall design plan, and pattern of the stone veneer components within the design plan, can be imported from an image of an existing construction. A three-dimensional design plan can be implemented according to an embodiment of the invention.

The disclosed method further provides a way to substantially replicate either an existing construction or the design plan of the existing construction.

For example, the disclosed method provides a way to replicate an historical veneer stone fireplace.

The presence of both concave and convex curves on the same component made according to the disclosed method provides a means to interconnect or interlock the complementary components in an interesting design or pattern that was previously difficult, if not impossible to achieve with natural stone veneer.

Delivery of precut veneer stones of predetermined perimeter contours facilitates installation to the extent that a relatively un-skilled homeowner could install the stones by using a kit according to an embodiment of the invention, without help from a mason or construction worker. Accordingly, a skilled mason could install the disclosed stone veneer components more precisely, more quickly, and with greater design potential, than by using existing methods for installing natural stone in a veneer application.

BRIEF DESCRIPTION OF THE DRAWINGS

The foregoing and other objects, features and advantages of the invention will be apparent from the following more particular description of illustrative embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
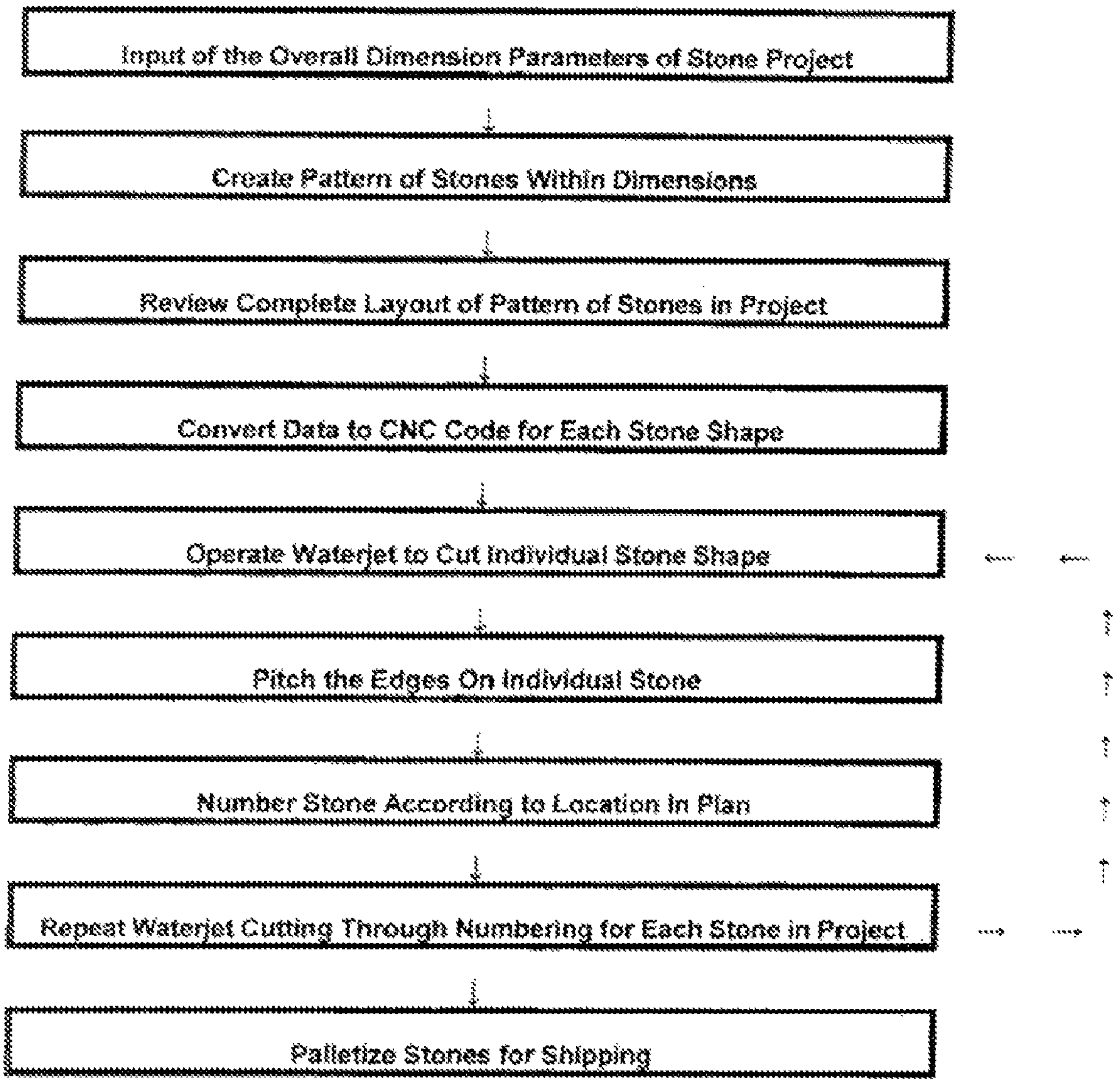
FIG. 1 is a process flow diagram according to an embodiment of the invention.

A description of preferred embodiments of the invention follows. If will be understood that the particular embodiments of the invention are shown by way of illustration and not as limitations of the invention. At the outset, the invention is described in its broadest overall aspects, with a more detailed description following. The features and other details of the compositions and methods of the invention will be further pointed out in the claims.

We have now discovered a process for designing and previewing every stone in a complete veneer stone project prior to a single stone being cut. The process disclosed herein enables the precise and predictable cutting of natural stone to form a stone veneer component having a perimeter of predetermined contour, and finished edge such that the stone veneer component appears to have been shaped using traditional chisel and hammer techniques. The disclosed method provides a novel way to pre-cut stone veneer components for delivering to a job site, thereby facilitating and dramatically increasing the speed of installation, while ensuring the installed project matches the approved plan.

The present invention is directed to novel methods for forming natural stone veneer components. Disclosed herein is a method of using an abrasive waterjet from an abrasive waterjet machine in a manner that contradicts the directions provided by the manufacturers of the machines, and that is contrary to the way in which the machines are traditionally used to cut stone.

Manufacturers' directions for using water jet machines to cut hard materials such as stone emphasize the need to keep the cutting head of the machine, and the waterjet, as close as possible to the surface of the stone being cut. For example, typical directions may prescribe maintaining a distance of the head from the surface of the stone equal to from about one twenty second (1/22) inch to a maximum of about one quarter (1/4) inch. If such close distances are not maintained, manufacturers warn that the waterjet will lose force and the result will be an imprecisely cut edge. This is because the waterjet slows down and loses energy, the longer it takes to pass through the air to reach the surface to be cut.

Contrary to the prescribed methods for cutting stone, we have now discovered that a combination of raising the waterjet to a distance of from about 0.3 inch to about 4 inches from a contact surface of the stone; and cutting through the stone by contacting the contact surface of the stone with an abrasive waterjet from the waterjet machine, the waterjet at a pressure of from about 18,000 pounds per square inch to about 80,000 pounds per square inch, or preferably at a pressure of about 55,000 pounds per square inch, results in formation of the natural stone veneer component having a perimeter of a predetermined contour.

In a preferred embodiment, the cutting head or nozzle of the waterjet is maintained at a distance of from about 0.625 inch to about 2.5 inches, or a distance of from about 1 inch to about 2 inches above the surface of the stone being cut with the waterjet. The distance of the nozzle from the surface of the stone being cut can be from about 0.625 inch to about 2 inches. In another embodiment, the cutting head is maintained at a distance of from about 0.5 inch to about 2 inches from the stone. The most suitable distance for a particular stone can be determined with no more than routine experimentation.

A critical and unique part of Applicants' process is the raising of the cutting head, in one embodiment of the invention, to from about 0.3 inch to about 4 inches above the stone material surface. This significant stand off from the material is exactly opposite to the way that waterjets are currently used in ail other cutting applications and the way manufacturers of such equipment prescribe usage in their documentation. Waterjets are intended to produce highly precise cuts, with a crisp edge by keeping the waterjet head as tight as possible to the material being cut, such that the cutting head never contacts any point of the stone material. Because veneer stone has a relatively rough surface, waterjets have not been used for veneer.

In typical waterjet applications, the goal is to reduce taper at the bottom of the cut by reducing cutting speed to ensure the cut is of consistent geometry through the thickness of the material. Often, any taper that results is ground or machined down in a secondary process such that the entire edge is consistent throughout the depth of the material. Contrary to this convention, the Applicant's process fractures away both the taper and additional edge material, such that the geometry of the cut throughout the thickness of the material varies even more.

The natural stone material generally useable in the methods described may include, for example, quartzite, granite, fieldstone, sandstone, limestone, or combinations thereof. Other types of natural stone may also be suitable. The material suitable for producing veneer stone typically ranges in thickness from about 3/4 inch to about 6 inches, and given the nature of quarried stone and natural fieldstone, the overall size of the material may be of irregular sizes and shapes, of sufficient size to cut one or more finished veneer components from the material. These stone materials are typically quarried or excavated from fields, in the case of fieldstone, and the surfaces are characteristically varied such that material thickness measured in any given spot can range by as much as 2" over the surface of the stone. The natural stone veneer components formed by the disclosed process are easily set in place in a veneer stone project.

Depending on the type of stone to be cut and the particular characteristics of the machine used and the abrasive used, various factors including pressure, speed of the cut, diameter of the waterjet orifice, and distance of the cutting head from the material can be varied, with no more than routine experimentation, to produce desired results.

In one embodiment, the diameter of the orifice of the waterjet head is from about one-fifteen thousandth (1/15,000) inch to about one twenty-five-thousandths (1/25,000) inch. One can simply choose the orifice that works best with the pump configuration on the particular waterjet.

The speed of the cut can be varied in relation to the thickness of the stone being cut. If the cut is made too fast, the waterjet won't cut through the stone. For thicker stone, the speed at which the jet folly penetrates the stone is the maximum speed at which one could run the machine. At the maximum speed, one should look at the bottom edge of the cut. The bottom edge will be jagged, becoming increasingly smooth towards the top of the cut. As long as the jet is fully penetrating the stone, the jagged cut is entirely acceptable and indicates that the cut is running close to an optimum speed for that thickness of stone. If there are intermittent sections along the path of the cut for which the waterjet does not fully penetrate, the stone may still be used, provided the sections are small enough to be broken away with a chisel and hammer. Such uncut sections are an indication that the cutting speed should be reduced slightly until optimum cutting speed is achieved consistently, as indicated by a continuous penetration of the stone by the waterjet.

The machine used by Applicants for the method of cutting stone disclosed herein is the 4800 model abrasive waterjet machine manufactured by FLOW International Corporation (Kent, Wash.), and having a 50 horsepower Hyplex Direct Drive Pump.

Applicants used 60 mesh garnet, but the range could be, for example, from about 50 mesh to about 120 mesh garnet. Garnet is the most popular abrasive used in this type of machine, but other abrasives can also be used to achieve the desired results.

Applicants used a flow rate of about 1.2 pounds (lb) per minute. Other rates can also be suitable, generally a range of from about 0.25 lbs to about 2.0 lbs per minute. The flow rate is determined by the volume of water pumped through the head, and that volume of water is determined by the size of the pump. For this reason, a smaller machine might use about one-half pound per minute (0.5 lb/min), and a larger machine up to about 2 lb/min. Above 2 lb/min, almost any head would clog up Once a stone has been cut, the rough edge at the bottom of the cut should be finished for two reasons: 1) to ensure desired fit in relation to other stones when installed and 2) for aesthetics. Because the roughness at the bottom of the cut causes an outward taper from the predetermined perimeter contour, it must be removed for the veneer stone component to fit as originally designed in relation to other veneer stone components in the overall project. Secondly, the irregular, jagged cut would not be considered a desirable appearance when installed in a complete project. For aesthetic reasons, the visible perimeter edges of each stone are finished to give the appearance that the entire stone had been worked using traditional techniques of shaping the stone veneer component with a chisel and hammer.

As described above, the technique for finishing the edges is called "pitching the edge". Pitching the edge may be accomplished by hammering, by chiseling with a hammer and chisel, by pneumatic chiseling, by tumbling the stone veneer component with an abrasive medium in a container, or by breaking pieces of stone off from the edge with hydraulic nippers, a jaw-like tool available commercially.

By contacting the edge of the stone with a chisel then striking the chisel with a hammer, or directly contacting the stone with a hammer, the upper corner of the cut will fragment off. This will leave an irregular surface, and expose the internal character of the stone. The character will depend on the type of stone being cut and it's internal structure. Depending on the desired quality of edge, the chisel or hammer blow may be applied an eighth (1/8) inch in from the edge for a more refined look, up to one (1) inch in from the edge for a rougher final appearance. This process is repeated along the perimeter of the cut to finish all edges along the surface of the stone intended to be visible when the stone veneer component is installed. Breaking this edge removes the rough taper left from running the machining at the highest speed possible, while still penetrating the stone. When complete, the top edge intended to be visible when installed will be recessed in from the clean cut perimeter of the stone veneer component. This technique of "pitching the edge" can be mechanized using pneumatic chisels or hydraulic nippers to remove the top edge in a way that exposes the natural character of the stone in the area that remains. Optionally, edges can also be finished with less control over the end result using tumbling methods in which veneer stone components are tumbled in a mechanized container which turns them with the presence of an abrasive medium. "Optionally", as used herein, means that the subsequently described event or circumstance may or may not occur, and that the description includes instances where the event occurs and instances where it does not.

Turning now to the drawings, FIG. 1 is a process flow diagram for production of a stone project according to an embodiment of the invention. The design parameters of the entire project can be input into a computer program. The cutting patterns for the veneer components of a particular project can be the same or different; and a plurality of cutting paths can be produced. As shown by the broken arrow in FIG. 1, the procedure may be varied. For example, after cutting the desired number of stone components of one shape, one can operate the waterjet machine to cut a component of different shape or contour.

According to an embodiment of the disclosed invention, a plurality of interconnecting natural stone veneer components having perimeters of the same or different contours can be cut; the components can then be labeled according to the design parameters of the project; and, the components can be assembled into a package or kit for installation. The disclosed kit can further include a map of the total design of the project, the map identifying locations and orientations of each veneer component. Such a kit can include the pre-cut and finished natural stones for an installation in any project design for which natural stone veneer is used.

Figures 2A, 2B:
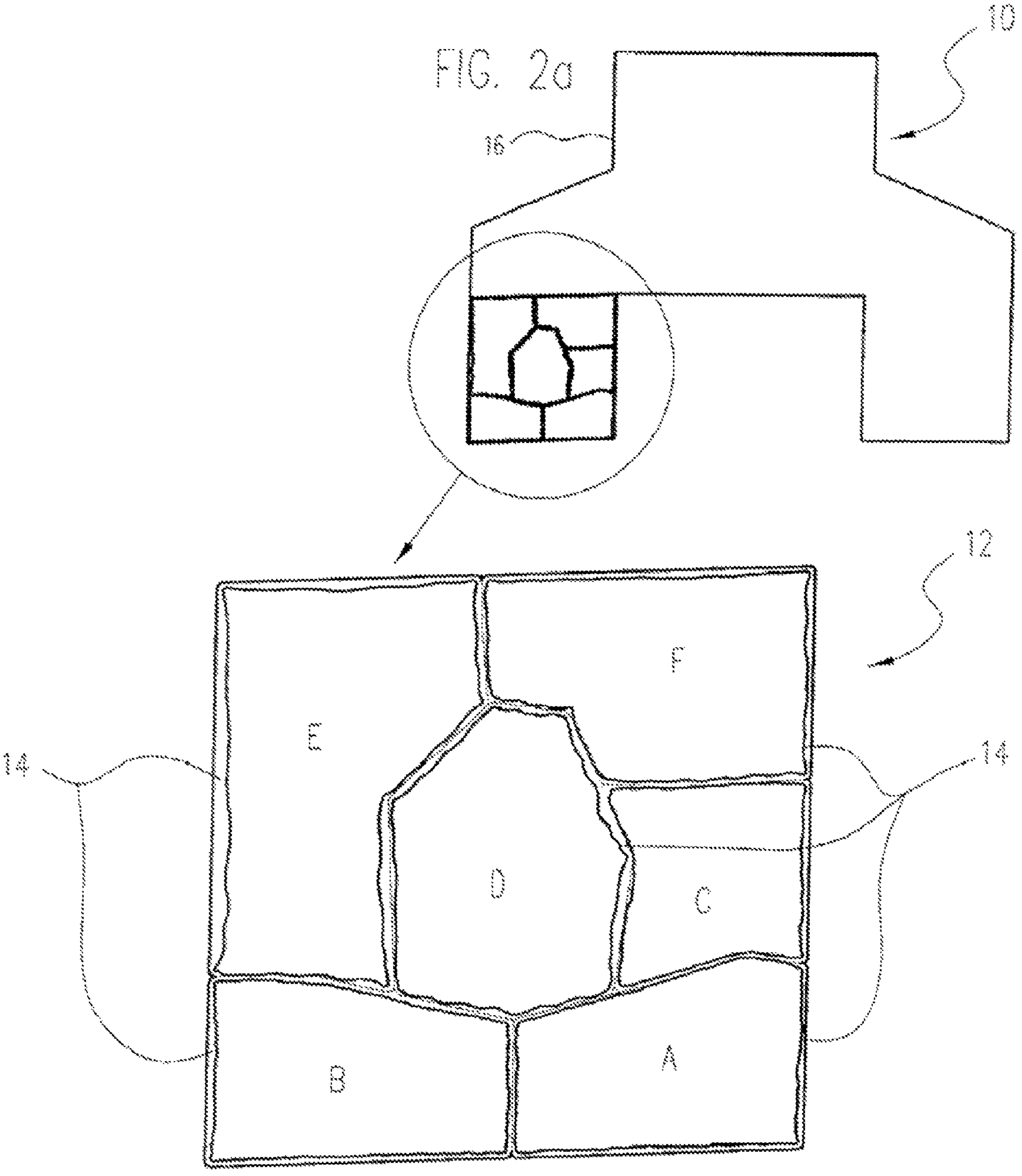
FIG. 2*a* is an example a partial CAD design plan comprising overall dimensions and shape of a finished stone veneer project, a fireplace.
FIG. 2*b* is an example of a complete CAD design plan for a section of interconnecting veneer stone components (A-F) as part of the veneer fireplace project shown in FIG. 2*a*.

FIG. 2*a* represents an overall CAD plan (10) which can show the dimensions and shape of a proposed fireplace (16) project comprising stone veneer produced according to an embodiment of the invention.

FIG. 2*b* depicts a CAD plan (12) of a section of the plan (10) with A-F interconnecting veneer stone components (14).

Figure 3:
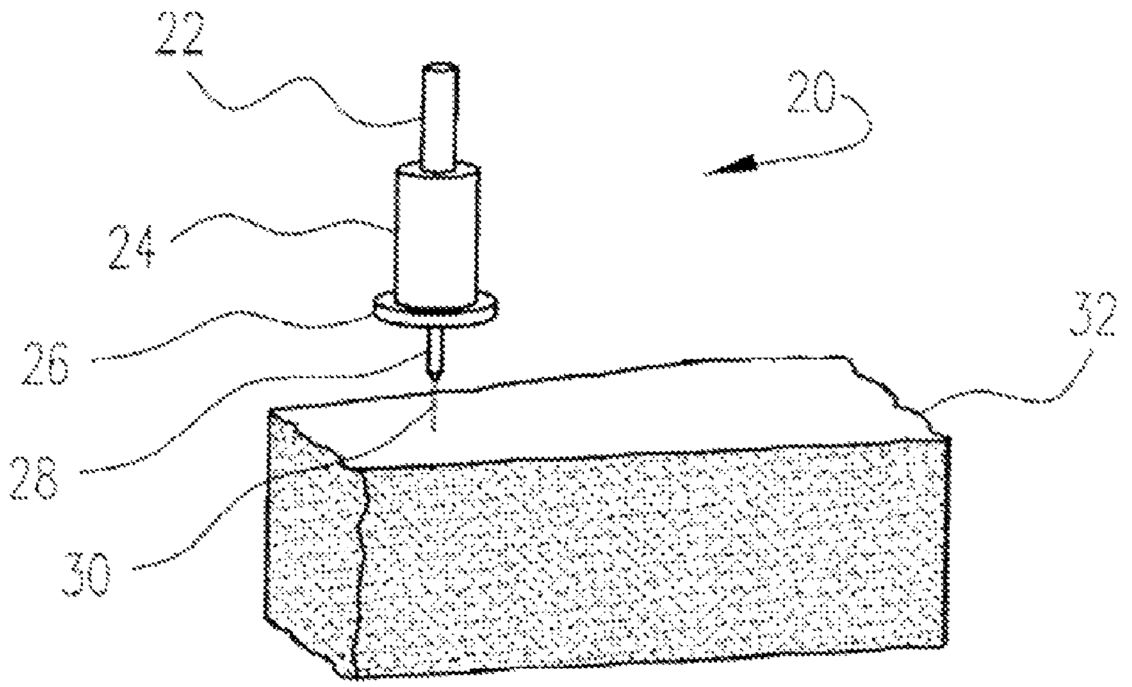
FIG. 3 is a schematic view of a waterjet machine and a cutting process by which the cutting head is elevated from the material being cut.

FIG. 3 is a schematic view of a waterjet machine (20) positioned to cut a stone (32) to produce veneer stone components. The waterjet machine (20) comprises a water inlet (22), a housing (24) surrounding a portion of the water inlet and the abrasive inlet (not shown). The guard (26) is located below the housing (24) and surrounds a portion of the water inlet (22) above the nozzle or cutting head (28) of the water inlet (22) and abrasive mixing tube. According to the disclosed method, the cutting head (28) is positioned over the contact surface of the stone from about 0.3 to about 4 inches, and the waterjet (30) is at a pressure of from about 18,000 pounds per square inch to about 80,000 pounds per square inch.

Figure 4:
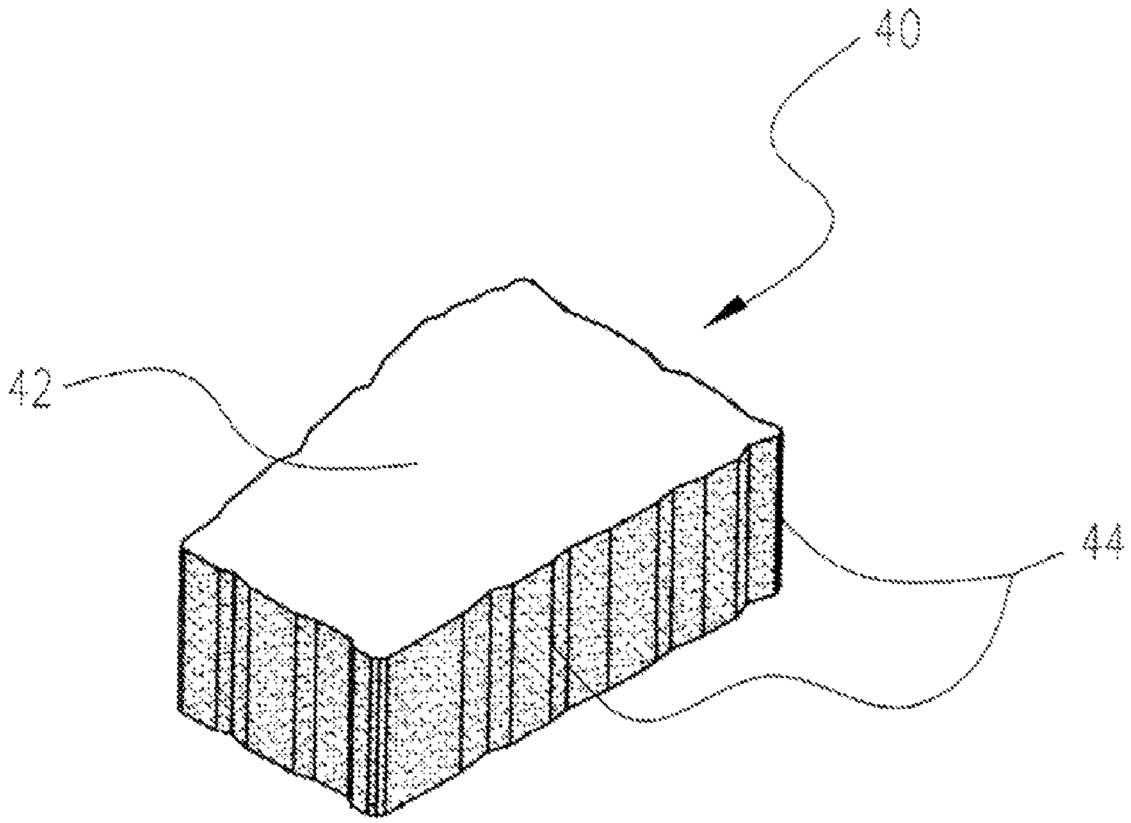
FIG. 4 is a perspective view of a stone that was cut by the disclosed waterjet process, and displaying the crisp edges resulting from the waterjet cutting.

FIG. 4 depicts a stone veneer component (40) having a fop surface (42) and edges (44) cut by a waterjet.

The striated grooves on the abutting edges of each interconnecting stone provides superior stability for both dry and wet with mortar applications. When mortar is used, the striations offer a multi-faced surface area which grips the mortar and helps to lock the stone in place. This helps to keep the stone in place when the mortar is drying and one the mortar has cured, the surface is like a sequence of mini-keys bonding the stone and mortar. Over the life of the installation, this grip will reduce separation of the mortar from the stone, in dry applications, the striated surfaces provide a similar gripping function. The groove pattern on each stone abuts to the groove pattern on each surrounding stone, providing multiple points of contact and locking effect that enhances stability.

The corner piece produced by the disclosed method allows the use of thin veneer stone in applications where weight and thickness restrictions generally require lighter, thinner stone, while still achieving the look of full thickness stones at outside corners. Corner pieces have previously been made for natural stone, but these tend to be flawed in their structure. Because such stones are cut using diamond blades, the back inside corner of the stone has a 90 degree angle, often with the cuts from each direction intersecting in an irregular manner. As a result, those corner pieces are highly prone to cracking at the 90 angle during shipment or during installation. Our corner design is unique in that we have replaced the sharp 90 degree angle with a two wider angles on each side, connected by a small stretch of stone. This structure provides greater material at the point of greatest stress and makes for a much more stable piece, less prone to breakage.

Figure 5:
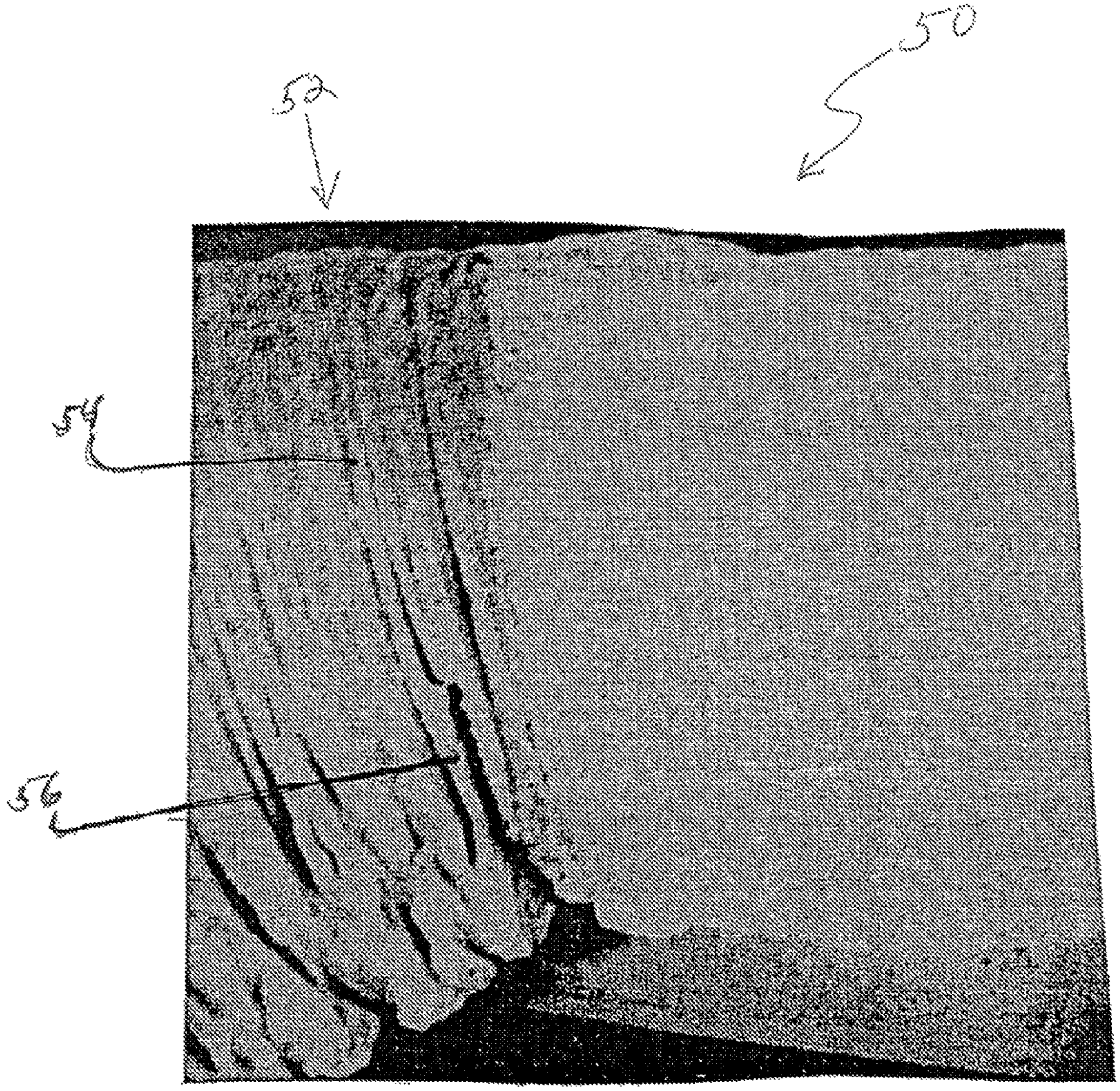
FIG. 5 is a photograph of the cut edge of a veneer stone component cut by the disclosed method.

FIG. 5 is a photograph of a cut edge of stone (50). Arrow (52) shows the initial direction of the waterjet (30) on contact with the stone surface. The flat portion (54) of the cut is closest to the head, nozzle, or orifice of the waterjet machine. The striated portion (56) of the cut results from dispersal of the waterjet.

Figure 6:
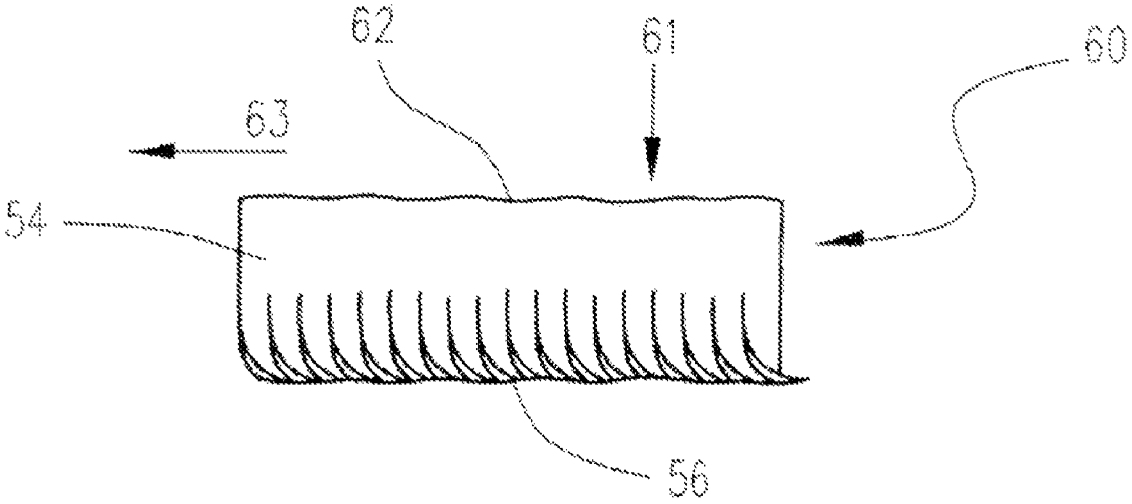
FIG. 6 is a schematic elevational view of the taper left by running the waterjet at a speed sufficient to fully penetrate the material showing fiat cut and working into the rougher striated cut at increasing distance from the waterjet cutting head.

The cut shown in FIG. 5 is shown schematically in FIG. 6, a partial section view (60) of a cut made by a waterjet machine on a contact surface (62) of veneer stone. Arrow (61) depicts the initial direction of the waterjet as it contacts the surface (62) of the stone. Arrow (63) shows the direction of the cutting head movement following a predetermined path as it cuts through the stone.

Figure 7:
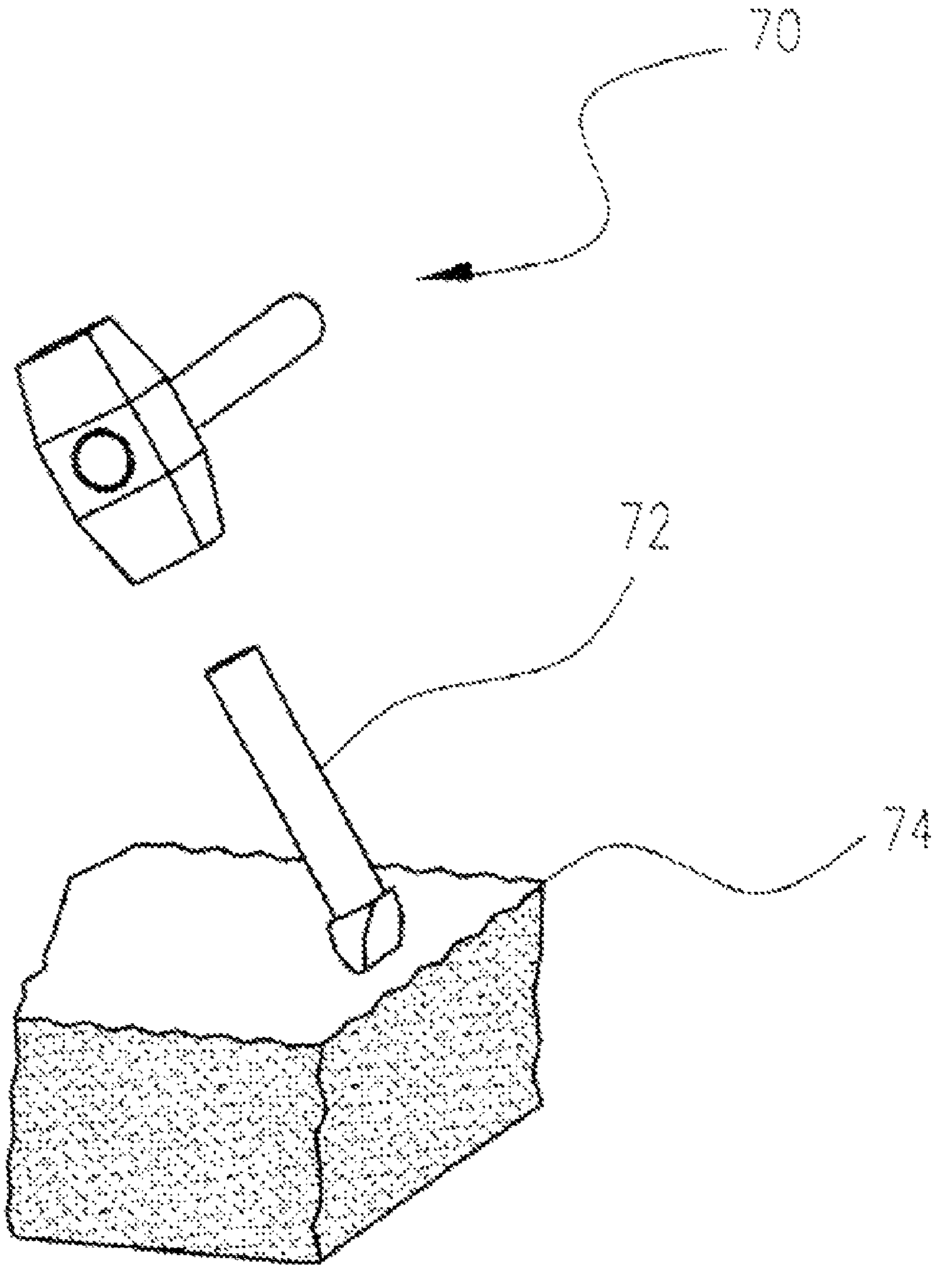
FIG. 7 is a view of a chisel and hammer on the edge of a stone to finish the edge using the "pitching the edge" technique.

FIG. 7 depicts a hammer (70) used to strike a chisel (72) in contact with the edge (74) of a stone to be pitched.

Figure 8:
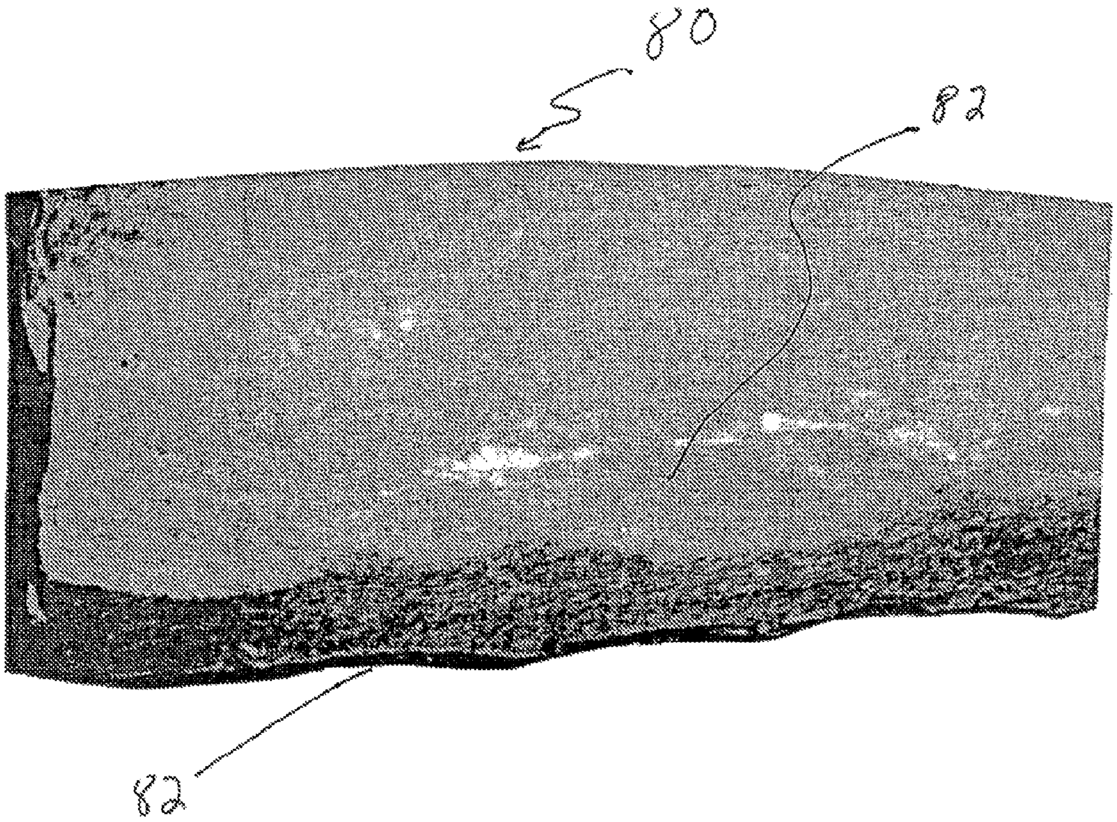
FIG. 8 is a photograph showing a perspective view of the completed edge of a stone veneer component after cutting and finishing of the edge.

FIG. 8 is a photograph of a perspective view (80) of a veneer stone component showing a cut end and finished edge (82) of the stone veneer component.

Figure 9:
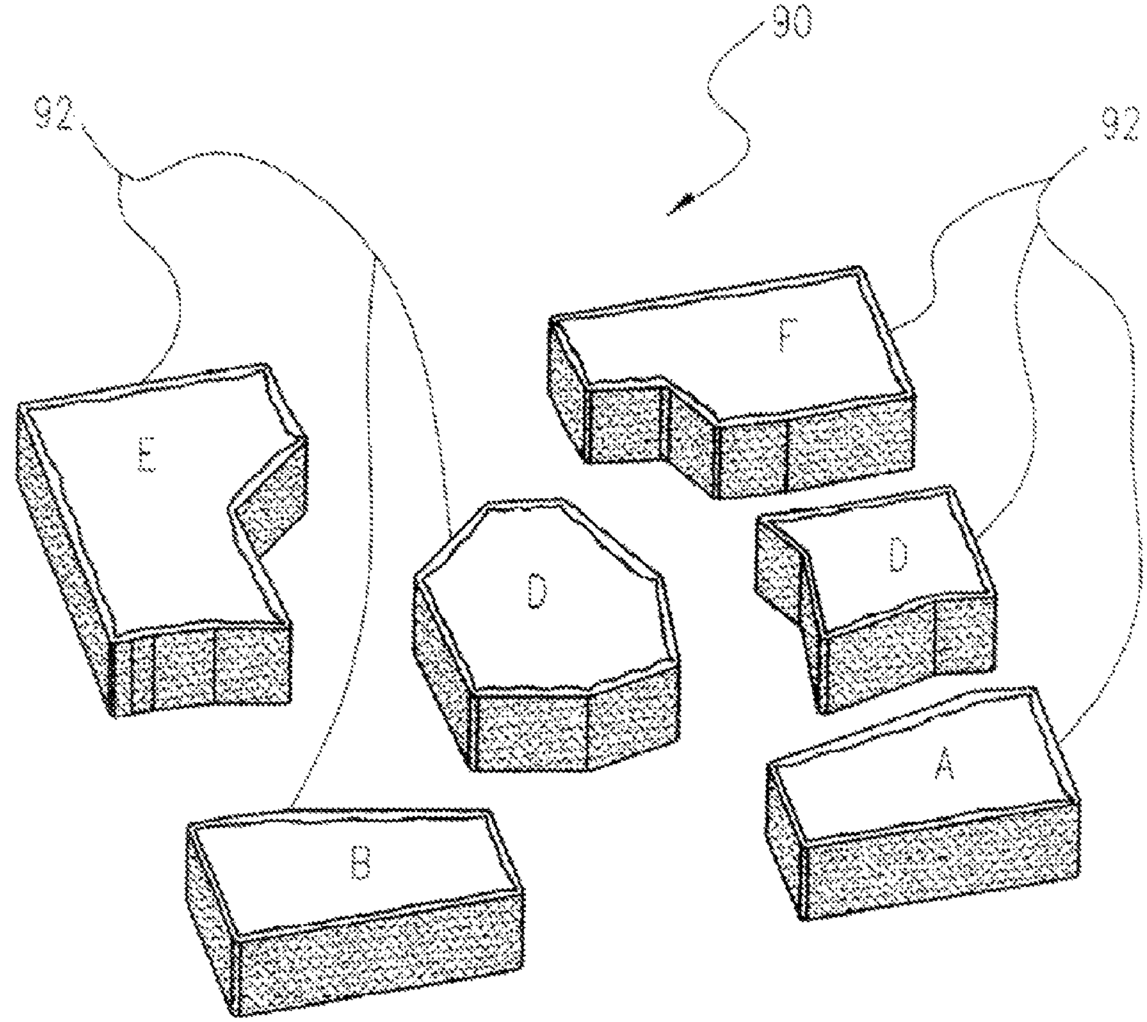
FIG. 9 is a perspective view of several stones (A-F) lying fiat showing how they have been cut to fit together, as in FIG. 2*b* and numbered according to the location and position in a design plan, shown in FIG. 2*a*.

FIG. 9 is a perspective view (90) of several cut veneer stones (A-F). The individual veneer stone components (92) are labeled (A-F) according to a CAD plan.

Example

1) We set up the Computer Aided Design (CAD) file of the complete project and how it will look when fully installed. We started with the overall dimensions and profile of the installation and then filled in the middle area with the intersecting pieces to create the design pattern. This enabled us to print out a design proof for the customer and make any changes necessary to receive approval from the customer on the design. In this way, the customer can view a digital representation of how the natural stone veneer components will look when cut and installed in the finished project.

2) We then broke apart the design into individual components that were to be cut. For the design plan for the project, each component was of unique shape. Optionally, there can be certain components that repeat throughout the pattern, and for such shapes, we cut the appropriate numbers of that same shape.

3) We converted the CAD design for each unique component to a machine readable format to produce a cutting path for the waterjet.

4) We loaded a piece of natural stone stock onto the waterjet cutting table, such that the face of the stone that we intend to be visible when the stone veneer component is finally installed was placed down. The material was approximately 4 inches thick, with natural variations across the surface, and of irregular outer perimeter that was 24" long at its longest dimension and 12" wide at its widest dimension.

5) We loaded the cutting path file for the piece that we planned to cut from the natural stone material and oriented the cutting head of the waterjet machine, a 4800 model abrasive waterjet machine (FLOW International Corporation, Kent, Wash.), and having a 50 hp HYPLEX Direct Drive Pump, over the raw material at a stand-off distance of about one (1.0) inches from the surface of the stone. The abrasive used was garnet.

6) The configuration of the machine was set to cut at 55,000 pounds per square inch (psi) of pressure, flow rate of about 1.2 pounds (lb) per minute, and the speed of cut adjusted to cut cleanly through the full thickness of the material. It is important to note that, for thicker pieces of stone, the programmed speed of cut should be reduced in relation to the increased thickness of the material being cut.

7) We ran the cutting file to cut one finished piece from the material. By adjusting speed of cut, pressure and standoff, with only routine experimentation to find the ideal settings for that particular stone, we cut through the material. We then repeated the process, running each of the cutting path files for all the pieces in the original design.

8) Completed pieces were then numbered to identify them in a way that related them and their positioning to a print out or map of the complete job.

9) All stone components were placed on a pallet for delivery to the job site.

For reference—How the disclosed stone product may be used:

1) The pallet of stone components and the corresponding print out illustrating the orientation of each piece on the total design will arrive on a job site.

2) A mason, landscaper or homeowner will prepare an adequate base, foundation or support structure for the type of installation they have chosen. The base, foundation, shelf or support structure will be identical to that which the installer would normally need to prepare for the installation of natural stone veneer of similar size, type of stone and weight. There are two options—a dry installation or mortar installation. In both cases, the installation will follow normal procedures for installation of stone veneer, with typical considerations for the structural requirements of the project, applicable building codes and temperature considerations in the location of the installation.

a) For a dry installation, stones will be installed such that the outer perimeter of each stone will contact the outer perimeter of the stones surrounding it. No mortar will be visible from the outside of the installed project, however, small amounts of mortar may be applied to level the stones and provide a mechanism for attaching masonry ties to connect the stone to a supporting structure behind the installation. The dry installation of our stone veneer components will follow the existing techniques for the dry installation of veneer stone.

b) For a mortar installation, a cement base poured in accordance will local building codes will be completed and allowed to dry, if there is not one in place already. The mason, landscaper or homeowner will typically cover the cement base with a layer of mortar, between about 1 inch and about 2 inches thick, and then set the first course of individual stones on top of the mortar, maintaining them level relative to each other. Between stones, a consistent mortar joint of usually between ⅜ and ¾ inch will be maintained on all joints. Once filled with mortar and finished properly, the joint will dry to provide a barrier against moisture getting behind the stones, freezing and moving them from the mortar. The mortar installation of our stone veneer components will follow the existing techniques for the mortar installation of veneer stone.

3) The complete veneer installation is now complete, and if will embody the exact specifications of the original design plan.

The method disclosed herein provides a system for inputting the outside design parameters into a CAD software and creating a complete design plan of natural stone components for veneer applications such as walls, building exteriors, fireplaces, chimneys and interior applications. Using the methods of the invention, it is possible to design a pattern of interconnecting natural stone pieces and precisely cut individual components corresponding to the design. Such interconnecting pieces would fit together easily if they were cut according to a method disclosed herein because of the precisely cut edges. This process eliminates the need for cutting in the field and enables a designer, architect, installation professional or homeowner to preview the overall pattern of individual stones prior to installation. These stone pieces can be set together with or without mortar for veneer applications such as wails, building exteriors, fireplaces, chimneys and interior applications.

Furthermore, the disclosed methods for cutting a predetermined contoured perimeter and finishing the top edges can be used to produce a kit of interconnecting natural stone veneer components cut from quartzite, granite, fieldstone, limestone or sandstone. Optionally, the kit may include installation instructions and a print out or map of the total design identifying the locations and orientations of each stone component.

An inventor of the above-described subject matter has now discovered an improvement to the above-disclosed system, the improvement relating to a process for achieving a weathered, aged, smooth, rounded look on our pre-cut natural stone veneer components.

According to one embodiment of the invention disclosed herein, pre-determined shapes of natural veneer stone components are cut, and then a rounded, smooth finish on the edges of the natural stone veneer components is achieved by treating the natural stone veneer component to achieve a weathered appearance. In one embodiment of the invention, the process outlined below is employed for artificially weathering the pre-cut natural stone veneer components.

Overview: After the natural stone veneer components have been cut, numbered and chiseled using an embodiment of the process described above, the natural stone veneer components are tumbled, for example, in a moving container for a period of time sufficient to achieve the desired appearance. The tumbling is an aesthetic modification to achieve a more natural look for the construction project. The container used for tumbling may be moved in any of a number of modes, non-limiting examples of a suitable mode including a rotating manner, a shaking manner, and a rocking manner such as a back and forth rocking manner.

The period of time used for tumbling in one embodiment may be approximately from about 3 minutes to about 5 hours. In another embodiment the period of time may be from about 5 minutes to about one hour. In another embodiment the period of time may be from about 10 minutes to about 30 minutes. By tumbling the stones against each other, or with an aggregate, the effect is an overall smoothing of all edges of the natural stone veneer components, resulting in a weathered look that is highly desirable in natural stonework. After tumbling, the stones may be placed in order on pallets as described above, and may be shipped to the jobsite for installation as described above.

Any suitable tumbler may be used to achieve the disclosed artificially weathered natural stone veneer components. For example, a commercially available concrete mixer (Stone Construction Equipment, Inc., Honeoye, N.Y.) may be used.

EXEMPLIFICATION

1. All stone veneer components (hereinafter "the stones") were first cut and numbered using the process described above. All the stones were shaped and identified according to the location at which they would fit together in the overall project before the stones were tumbled. The surfaces that would be visible when the stones are installed in the stonework project were chiseled to fragment off the precisely cut edge, thereby exposing the natural internal structure of the stone.

2. The tumbler used was a round drum container that was turned from the midpoint at a speed between about 5 rotations per minute and about 200 rotations per minute by an electric motor. Alternatively, a gas engine, water power, or other motorized mechanism may be used to rotate the tumbler.

3. A number of stones prepared using the above-disclosed process were placed in the round drum container. We used from about two stones to about five hundred stones, depending on the size of the drum container used in each run.

4. Stone aggregate was added to the container for some of the trial runs. The quantity of stone aggregate used in some of the runs ranged from about one pound of aggregate about 500 pounds of aggregate, again depending on the size of the drum container used. A suitable size of stone aggregate may be from about 50 mesh abrasive to aggregate pieces having dimensions of about 6 inches by 6 inches by 6 inches. A suitable aggregate can be any natural stone, granite, sand, garnet or other stone material.

5. The drum was turned at one or more of the above mentioned speeds for a period of from about five minutes to about one hour, depending on the degree of roundness we desired in the finished natural stone veneer components. The longer the cycle time, the smoother and more rounded over the stones became.

6. Optionally, water may be added to the tumbler to reduce the creation of airborne dust. This is not necessary to achieve the desired finish. The quantity of water added may be, for example, from about 1 cup to approximately the total volume of the tumbling drum remaining after subtracting the volume of the stone and aggregate added to the tumbling drum. In other words, sufficient water may be added to fill the tumbling drum after the stone and aggregate has been added to the tumbling drum.

7. After the stones were tumbled, they were removed from the drum. An optional step is to wash the stones with water to remove any dust from the surface of the stones.

8. It should be noted that if any stones are broken in the tumbling process, the numbers etched in the back of the stones will identify the particular stones, and replacements may be run by repeating the original disclosed process for cutting the stones corresponding to the cut path for that specific numbered stone, then tumbling as described herein.

9. After tumbling, the stones are placed in numeric order on the pallets and prepared for shipment.

10. The types of stone material that can be put through this process include all types of granite, sandstone, limestone, quartzite and any natural stone material.

EQUIVALENTS

While this invention has been particularly shown and described with references to preferred embodiments thereof it will be understood by those skilled in the art that various changes in form and details may be made therein without departing from the scope of the invention encompassed by the appended claims.

What is claimed is:

1. A method of cutting and finishing a natural stone, the natural stone having a thickness of from about 1.5 inches to about 6 inches and having an irregular or varied surface such that the natural stone varies in thickness, to form a natural stone veneer component having a thickness of from about 1.5 inches to about 6 inches, having a perimeter of a pre-determined contour and an edge at the perimeter, and having a weathered appearance, the method comprising:

a) positioning a cutting head of an abrasive waterjet machine over the natural stone at a distance of from about 0.3 inch to about 4 inches from a contact surface of the natural stone;

b) cutting through the natural stone by contacting the contact surface of the natural stone with an abrasive waterjet from the waterjet machine, the waterjet at a pressure of from about 18,000 pounds per square inch to about 80,000 pounds per square inch, thereby forming the natural stone veneer component having a thickness of from about 1.5 inches to about 6 inches and having a perimeter of a pre-determined contour and an edge at the perimeter; and c) treating the natural stone veneer component to achieve a weathered appearance.

2. The method of claim 1, wherein the treating of the natural stone veneer component comprises tumbling the natural stone veneer component in a moving container for a period of time sufficient to achieve the weathered appearance.

3. The method of claim 2, wherein the moving container moves in a rotating manner.

4. The method of claim 2, wherein the moving container moves in a shaking manner.

5. The method of claim 2, wherein the moving container moves in a rocking manner.

6. The method of claim 2, wherein the tumbling in the moving container is continued for a period of from about 3 minutes to about 5 hours.

7. The method of claim 6, wherein the tumbling in the moving container is continued for a period of from about 5 minutes to about 1 hour.

8. The method of claim 2, wherein a stone aggregate is included for tumbling with the natural stone veneer component in the moving container.

9. The method of claim 2, wherein water is included for tumbling the natural stone veneer component in the moving container.

10. The method of claim 2, further comprising tumbling the natural stone veneer component in the moving container with at least one of: a plurality of natural stone veneer components, a stone aggregate, and water.

11. The method of claim 1, wherein the natural stone is chosen from quartzite, granite, fieldstone, sandstone, and limestone, or a combination thereof.

12. A method of preparing from a natural stone, the natural stone having a thickness of from about 1.5 inches to about 6 inches and having an irregular or varied surface such that the natural stone varies in thickness, a finished natural stone veneer component having a weathered appearance, having a thickness of from about 1.5 inches to about 6 inches, and having a perimeter of a pre-determined contour and an edge at the perimeter for installation thereof in a project, the method comprising:

a) programming, scanning or otherwise inputting a cutting pattern for forming the natural stone veneer component;

b) converting the pattern into a machine-readable program to produce a cutting path on an abrasive waterjet machine;

c) loading a cutting path file for the stone veneer component into the abrasive water jet machine;

d) positioning a cutting head of the waterjet machine over the natural stone at a distance of from about 0.3 inch to about 4 inches from a contact surface of the natural stone;

e) running the cutting path program and cutting through the natural stone by contacting the contact surface of the natural stone with a waterjet from the waterjet machine, the waterjet at a pressure of from about 18,000 pounds per square inch to about 80,000 pounds per square inch; and f) tumbling the natural stone veneer component in a moving container for a period of time sufficient to achieve the weathered appearance, thereby forming the finished natural stone veneer component having a weathered appearance, having a thickness of from about 1.5 inches to about 6 inches, and having a perimeter of a pre-determined contour and an edge at the perimeter for installation thereof in a project.

13. A finished natural stone veneer component having a weathered appearance made by the method of claim 2, having a thickness of from about 1.5 inches to about 6 inches and having a perimeter of a pre-determined contour and an edge at the perimeter.

14. A kit comprising a plurality of inter-connecting, finished natural stone veneer components having a weathered appearance made according to the method of claim 12, the finished natural stone veneer components having a weathered appearance having a thickness of from about 1.5 inches to about 6 inches, and having a perimeter of a pre-determined contour and an edge at the perimeter.

15. The kit according to claim 14, further including a map of a design of a natural veneer stone project, the map identifying the location and the orientation of each finished natural stone veneer component having a weathered appearance used to complete the project.

16. The kit according to claim 15, wherein the installation of the finished natural stone veneer components having a weathered appearance is a vertical installation project chosen from walls, building exteriors, fireplaces, and chimneys.

* * * * *